United States Patent [19]
Sundararaman

[11] Patent Number: 5,955,561
[45] Date of Patent: Sep. 21, 1999

[54] HYDROXY ESTERS AND AMIDES DERIVED FROM ACTIVE ESTER URETHANES AND THEIR USE IN FILM-FORMING COMPOSITIONS

[75] Inventor: Padmanabhan Sundararaman, McCandless Township, Pa.

[73] Assignee: PPG Industries Ohio, Inc., Cleveland, Ohio

[21] Appl. No.: 08/994,615

[22] Filed: Dec. 19, 1997

[51] Int. Cl.$^6$ ................................................. C08G 18/42
[52] U.S. Cl. .............................. 528/84; 560/25; 560/158; 544/221; 544/222; 556/414; 556/419; 556/420; 525/400; 525/454; 525/456; 528/25; 528/26; 528/28; 528/45; 528/49; 528/266; 528/292; 252/182.26
[58] Field of Search ................. 560/25, 158; 252/182.26; 544/221, 222; 556/414, 419, 420; 525/454, 400, 456; 528/45, 25, 26, 84, 292, 266, 49

[56] References Cited

U.S. PATENT DOCUMENTS

| | | | |
|---|---|---|---|
| 4,252,703 | 2/1981 | Patzschke et al. | 260/29.2 EP |
| 4,364,860 | 12/1982 | Patzschke et al. | 525/127 |
| 4,373,059 | 2/1983 | Patzschke et al. | 524/761 |
| 4,373,072 | 2/1983 | Patzschke et al. | 525/438 |
| 5,130,405 | 7/1992 | Walker et al. | 528/78 |
| 5,155,201 | 10/1992 | Gardon et al. | 528/78 |
| 5,175,227 | 12/1992 | Gardon et al. | 528/45 |

FOREIGN PATENT DOCUMENTS

| | | |
|---|---|---|
| 361587 | 3/1981 | Austria . |
| 378783 | 9/1985 | Austria . |
| 383818 | 8/1987 | Austria . |
| 726 284 A1 | 12/1995 | European Pat. Off. . |
| 51-139830 | 2/1976 | Japan . |
| 52-25830 | 2/1977 | Japan . |

OTHER PUBLICATIONS

Polyurethane Polyols: Ester–Bond Free Resins For High Solids Coatings—1992 Joseph J. Mattiello Memorial Lecture, John L. Gardon, Akzo Coatings Inc.

*Primary Examiner*—Rachel Gorr
*Attorney, Agent, or Firm*—Dennis G. Millman

[57] ABSTRACT

Novel hydroxy ester, hydroxy amide, and amide functional compounds are provided comprising the reaction product of:

(a) an active ester functional material having the structure:

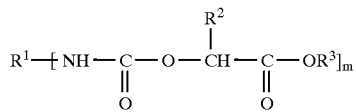

wherein $R^1$ is derived from a polyisocyanate; m is at least 2; $R^2$ is a lower alkyl or alkoxy group; and $R^3$ is a lower alkyl group; and (b) ammonia, a diol, or an amino functional material having the structure:

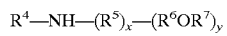

wherein $R^4$ is —H or alkanol; $R^5$ is a polyvalent linking group comprising alkylene, alkylamino, urethane, or amido; x is 0 or 1; $R^6$ is a divalent linking group comprising alkylene, silane, or siloxane; $R^7$ is H or a lower alkyl; and y is 1 to 3. The compound is useful in curable film-forming compositions.

23 Claims, No Drawings

HYDROXY ESTERS AND AMIDES DERIVED FROM ACTIVE ESTER URETHANES AND THEIR USE IN FILM-FORMING COMPOSITIONS

BACKGROUND OF THE INVENTION

Curable film-forming coating compositions have long been used in automotive and other industrial manufacturing fields. Curable compositions, that is, compositions that form hard surface protecting layers by chemical crosslinking offer better protection (as opposed to lacquers) to substrates because of their ability to resist damage by solvents, acids, and other chemicals, and effects of weathering. In order to cure by crosslinking, curable coating compositions contain chemical groups that are reactive under curing conditions to effect the required crosslinking.

In addition to the crosslinking functionality, curable crosslinking compositions contain compounds, usually polymeric, that include chemical groups selected for the properties they impart to the cured coating. Different types of polymers may be utilized in curable film-forming compositions, including polyesters, acrylics, polyurethanes, and polyepoxides. Each type of polymer contains specific chemical groups, providing unique properties to a cured composition. Urethanes are often desirable in coating compositions because they provide durability, hardness, and environmental etch resistance. A common way to provide urethane functionality in curable coating compositions is to use isocyanates as the crosslinking fumctionality, whereby the reaction products with polyols are urethanes. However, a disadvantage of this approach is that isocyanates are highly reactive and require careful handling and environmental control.

SUMMARY OF THE INVENTION

It is an object of the present invention to provide compounds that may be used in curable film-forming compositions, providing film-forming compositions that overcome many of the drawbacks of prior art compositions.

In accordance with the present invention, compounds having hydroxy ester, hydroxy amide, or amide groups are provided, which compounds provide crosslinking functionality to curable coating compositions. The compounds of the present invention comprise the reaction product of:

(a) a substance containing an active ester group, which has the structure:

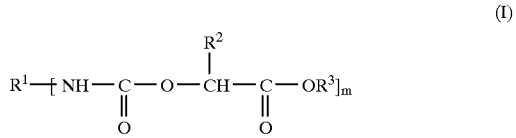

(I)

wherein:
$R^1$ is derived from a polyisocyanate $R^1(NCO)_m$ reacted with an active hydrogen-containing material to form the urethane group in Structure (I), and may include a wide range of substituted and unsubstituted alkyl, cycloalkyl, aryl and alkylaryl groups corresponding to the backbone structures of commercially available polyisocyanates;
m is at least 2;
$R^2$ is an alkyl or alkoxy group having from 1 to 4 carbon atoms; and
$R^3$ is an alkyl group having from 1 to 4 carbon atoms; and (b) ammonia, a diol, or an amino compound having the structure:

$$R^4\text{---}NH\text{---}(R^5)_x\text{---}(R^6OR^7)_y \qquad (II)$$

wherein:
$R^4$ is H or a hydroxyalkyl group;
$R^5$ is a polyvalent linking group comprising alkylene, aminoalkyl, urethane, or amido groups;
x is 0 or 1;
$R^6$ is a divalent linking group comprising alkylene, silane, or siloxane groups;
$R^7$ is H or an alkyl group having from 1 to 4 carbon atoms; and
y is an integer from 1 to 3 (when x=0, y=1, to satisfy the nitrogen valence).

Also provided are curable film-forming compositions that include the hydroxy ester, hydroxy amide, or amide functional compounds described above in combination with at least one crosslinking material having groups that are reactive with polyols or amides.

Because the active ester functional materials of Structure (I) contains urethane groups, the compounds of the present invention permit introduction of urethane groups into a cured coating without the use of unreacted isocyanates in the liquid coating composition The presence of the urethane groups permits providing the typical urethane characteristics of durability, hardness, and environmental etch resistance to coatings that contain the materials of the present invention.

The compounds are additionally versatile in that some embodiments may be used in ether solventborne or waterborne film-forming compositions. This is an advantage relative to some conventional crosslinking agents that are limited to use in solventborne compositions.

DETAILED DESCRIPTION

The compounds of the present invention are suitable for use as resinous binders, as crosslinking agents, and as adjuvant resins in curable film-forming (coating) compositions. They may be combined with polymeric, oligomeric, or monomeric materials having groups that are reactive with hydroxyl or amide functionality. For example, a hydroxy ester functional compound of the present invention may be combined with polymers containing acid groups to provide a curable combination. Alternatively, the compounds of the present invention may be combined with aminoplast crosslinking agents in a curable composition.

Compounds of the present invention are suitable for use in such diverse applications automotive, industrial, and beverage container coatings. The compounds are additionally versatile in that they may be used in ether solventborne or waterborne film-forming compositions, depending upon the materials used to form the compounds. This is an advantage relative to some conventional crosslinking agents that are limited to use in solventborne compositions.

The hydroxy ester, hydroxy amide, or amide functional compound of the present invention is the reaction product of at least one compound of Structure (I) with at least one compound selected from the group consisting of ammonia, polyols, and amino compounds having the Structure (II) forth above.

The material of Structure (I) is an active ester; i. e., an ester functional compound having at least one hetero atom (e.g., nitrogen, oxygen, halogen) substituted on the carbon in the alpha position relative to an ester group. The oxygen atom in the urethane linkage attached to the alpha carbon in the material of Structure (I) renders the ester "active", i. e., more readily reactive with respect to transesterification than an unsubstituted ester.

In the active ester (I), branched groups on the alpha carbon (i.e., the $R^2$ group on the alpha carbon) may constitute a wide variety of groups, for example, alkyl or alkoxy. Alkoxy groups further increase the reactivity of the active ester. In the composition of the present invention, $R^2$ is preferably an alkyl or alkoxy group having from 1 to 4 carbon atoms.

The active ester (I) may be reacted with ammonia, undergoing amidation to yield a product having the structure:

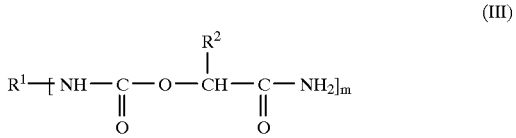

(III)

wherein $R^1$ and $R^2$ are as defined above.

When the active ester (I) reacts with a diol, it may undergo transesterification. Alternatively, the active ester (I) may be reacted with an amino functional material of Structure (II) to yield an amide, by reacting the ester group in (I) with the amino nitrogen in the material of (II).

The active ester (I) may be prepared by reacting a polyisocyanate having the structure $R^1$—$(N=C=O)_m$ with an alpha-hydroxy functional ester such as methyl lactate or ethyl lactate, or with an alkyl hemiacetal of an alkyl glyoxylate under reaction conditions typically used for isocyanate-hydroxyl reactions, as known to those skilled in the art. The hemiacetal of the alkyl glyoxylate may have the structure:

(IV)

where $R^2$ is an alkoxy group and $R^3$ is as defined above. Lower alkyl groups are preferred for $R^3$, most preferably methyl or ethyl groups, because these groups react most readily in transesterification, which is the reaction involved during crosslinking of a curable composition using the active ester compounds.

Suitable polyisocyanates used to prepare the active ester of Structure (I) include aliphatic or aromatic polyisocyanates or mixtures thereof. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. Preferred polyisocyanates include biurets and isocyanurates of diisocyanates, including mixtures thereof, such as the isocyanurate of hexamethylene diisocyanate, the biuret of hexamethylene diisocyanate, and the isocyanurate of isophorone diisocyanate.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. Other polyisocyanates include a reaction product of tetramethylxylene diisocyanate (TMXDI) with trimethylol propane (commercially available as CYTHANE 3160 from American Cyanamid) and a reaction product of one mole of trimethylol propane with 3 moles of toluene diisocyanate (commercially available as MONDUR CB from Bayer.)

The polyisocyanate may be reacted with an alpha-hydroxy ester such as methyl or ethyl lactate, or with an alkyl hemiacetal of an alkyl glyoxylate. A typical hemiacetal of an alkyl glyoxylate used to prepare the active ester (I) is the methyl hemiacetal of methyl glyoxylate, prepared by reacting glyoxylic acid with methanol under typical esterification conditions as known to those skilled in the art to form the methyl glyoxylate. After esterification, the methanol may be further reacted with the ester to form the hemiacetal. This hemiacetal is also available commercially as GMHA from Chemie Linz International.

$R^2$ may be a linear or branched lower alkyl group having from about 1 to about 4 carbon atoms, including methyl, ethyl, methyl ethyl, n-butyl, and isobutyl. Alternatively, $R^2$ may be a linear or branched lower alkoxy group having from 1 to 4 carbon atoms, including methoxy, ethoxy, methyl ethoxy, n-butoxy, and isobutoxy. $R^3$ may be a linear or branched lower alkyl group having from 1 to 4 carbon atoms, including methyl, ethyl, methyl ethyl, isobutyl, and the like. $R^2$ is most often a methyl or methoxy group. $R^3$ is most often a methyl or ethyl group.

In forming the compound of the present invention, the active ester (I) is reacted with either ammonia, a diol, or an amino functional material having the structure:

(II)

wherein $R^4$, $R^5$, $R^6$, $R^7$, x, and y are as defined above. The reactacts undergo an amidation reaction (in the case of reaction with ammonia or a material of Structure (II)) or a transesterification reaction (when a diol is used as a reactant). Reaction conditions and catalysts include those typically used for amidation and transesterification reactions, as known to those skilled in the art.

Diols which may be used to form hydroxy ester functional compounds of the present invention include low molecular weight diols such as ethylene glycol, neopentyl glycol, hydrogenated bisphenol A, cyclohexanediol, butyl ethyl propane diol, trimethyl pentane diol, 1,6-hexanediol, cyclohexanedimethanol, 2,2-dimethyl-3-hydroxypropyl-2, 2-dimethyl-3-hydroxypropionate, caprolactonediol, for example, the reaction product of epsilon-caprolactone and ethylene glycol, hydroxy-alkylated bisphenols, polyether glycols, for example, poly(oxytetramethylene) glycol and the like. Preferred diols include 2-methyl-1,3-propanediol and (+/−)1,2-butanediol.

In the amino compound of Structure (II) which is used to prepare hydroxy amide compounds of the present invention, $R^4$ may be hydrogen or a primary or secondary alkanol group containing from 1 to 6 carbon atoms, and may be linear or branched, including, for example, methanol, ethanol, methyl ethanol, n-propanol, isopropanol, isobutanol, cyclohexanol, and the like. $R^5$ is a polyvalent linking group (i.e, divalent, trivalent, or tetravalent) and may be alkylene, alkylamino such as ethylamino or n-propylamino, urethane, or amido functional. Appropriate alkylene groups may contain about 1 to about 6 carbon atoms and may be linear or branched, such as, for example, methylene, ethylene, propylene, 2,2-dimethyl propylene, 2,2-dimethylene propylene, and the like. $R^6$ is a divalent linking group and may be alkylene, silane, or siloxane functional. Appropriate alkylene groups may contain about 1 to about 13 carbon atoms and may be linear or branched, such as, for example, methylene, ethylene, propylene, 1,1-dimethyl propylene, 2,2-dimethyl propylene, n-butylene, and the like. Silane or siloxane groups may contain, for example, 1 to 6 silicon atoms, may be linear or branched, and may include branched alkyl or alkoxy groups each containing, for example, from 1 to 4 carbon atoms.

Examples of amino functional materials having the structure of (II) include, for example, alkanolamines such as diethanolamine, N-aminopropyl-N,N-diethanolamine, 2-amino-2-(hydroxymethyl)-1,3-propanediol, aminosilanes such as aminopropyl triethoxysilane, and reaction products of hydrazine with cyclic carbonates such as ethylene and propylene carbonate or with lactones such as those of the following general formula:

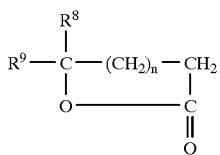
(V)

where $R^8$ and $R^9$ are each independently hydrogen or alkyl having 1 to 4 carbon atoms, and n is from 1 to 3. Suitable lactones include caprolactones such as gamma-caprolactone, delta-caprolactone, epsilon-caprolactone, monoalkyl caprolactones, such as methyl- and ethyl-epsilon-caprolactone, dialkyl caprolactones, such as dimethyl- and diethyl-epsilon-caprolactone, and the like.

N-aminopropyl-N,N-diethanolamine is particularly suitable for preparation of water soluble compounds, for use in the preparation of waterborne film-forming compositions. When N-aminopropyl-N,N-diethanolamine is reacted with the active ester functional material of (a), the reaction product may have the structure:

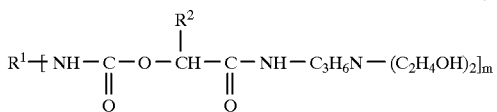
(VI)

where $R^1$ and $R^2$ are as defined above.

The hydroxy ester, hydroxy amide, and amide functional compounds of the present invention may be combined with materials having functional groups that are reactive with polyols or amides, to form curable film-forming compositions for use in automotive applications, in industrial coatings, and in other applications requiring the use of curable film-forming compositions. The hydroxy ester, hydroxy amide, and/or amide functional compound is present in the film-forming composition in an amount of about 10 to about 80 percent by weight, preferably about 50 to about 70 percent by weight, based on the total weight of resin solids in the film-forming composition.

Suitable materials having functional groups that are reactive with polyols or amides include polyacids, aminoplasts, and mixtures thereof. Polyisocyanates containing free or blocked isocyanate groups may also be used. Typically, when polyisocyanates containing free isocyanate groups are used, the film-forming composition is a two-package composition.

Suitable polyacids for use in the film-forming composition of the present invention include acid functional polymers and oligomers typically used in film-forming compositions, such as acrylic polymers, polyesters, including alkyds, and any other polymers and oligomers that are capable of being rendered acid functional, as known to those skilled in the art.

The acrylic polymers are copolymers of itaconic acid, acrylic or methacrylic acid or anhydride with one or more alkyl esters of acrylic acid or methacrylic acid, and optionally together with one or more other polymerizable ethylenically unsaturated monomers. Suitable alkyl esters of acrylic acid or methacrylic acid include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such acrylonitrile and methacrylonitrile; vinyl and vinylidene halides such as vinyl chloride and vinylidene fluoride and vinyl esters such as vinyl acetate.

Functional groups such as hydroxyl and amino groups may be incorporated into the acrylic polymer by using functional monomers such as hydroxyalkyl acrylates and methacrylates or aminoalkyl acrylates and methacrylates.

Besides acrylic polymers, alkyd resins and/or polyesters may be used as the polyacid in the curable film-forming composition of the present invention. Such polymers may be prepared in a known manner by condensation of polyhydric alcohols and polycarboxylic acids. Suitable polyhydric alcohols include, inter alia, ethylene glycol, propylene glycol, butylene glycol, 1,6-hexylene glycol, neopentyl glycol, diethylene glycol, glycerol, trimethylol propane, and pentaerythritol.

Suitable polycarboxylic acids include, for example, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

Where it is desired to produce air-drying alkyd resins, suitable drying oil fatty acids may be used and include those derived from linseed oil, soya bean oil, tall oil, dehydrated castor oil, or tung oil.

The polyesters and the alkyd resins may contain a portion of unreacted acid groups (provided by using excess polycarboxylic acid during preparation of the polyester or alkyd) which are available for crosslinking reactions. In addition, acid functional polyesters such as those disclosed in U.S. Pat. No. 4,650,718, at column 6, line 11 to column 8, line 20, may be used as the polyacid.

Materials having functional groups that are reactive with polyols or amides may include one or more aminoplasts containing methylol and/or methylol ether groups. Aminoplasts are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used is most often formaldehyde, other aldehydes such as acetaldehyde, crotonaldehyde, and benzaldehyde may be used.

The aminoplast typically contains imino and/or methylol groups and generally at least a portion of the methylol groups are etherified with an alcohol to modify the cure response. Any monohydric alcohol may be employed for this purpose including methanol, ethanol, butanol, isobutanol, and hexanol.

Preferably, the aminoplasts which are used are melamine-, urea-, or benzoguanamine-formnaldehyde condensates at least partially etherified with one or more alcohols containing from one to four carbon atoms.

Phenol-formaldehyde condensation products are also suitable.

Polyisocyanates which may be used in the curable film-forming composition of the present invention include those disclosed above for the preparation of the active ester functional material of Structure (I), as well as water-reducible polyisocyanates known to those skilled in the art.

When the isocyanate groups are to be blocked, any suitable aliphatic, cycloaliphatic, or aromatic alkyl monoalcohol or phenolic compound may be used as a capping agent for the polyisocyanate including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene lycol butyl ether, ethylene glycol methyl ether and propylene glycol methyl ether.

Other suitable capping agents include oximes such as methyl ethyl etoxime, acetone oxime and cyclohexanone oxime, lactams such as epsilon-caprolactam, and amines such as dibutyl amine.

The materials having functional groups that are reactive with polyols or amides are present in the film-forming composition in an amount of about 20 to about 90 percent by weight, preferably about 30 to about 50 percent by weight, based on the total weight of resin solids in the film-forming composition.

Catalysts that are suitable for use in the film-forming composition of the present invention include conventional esterification catalysts including ammonium compounds such as benzyltrimethyl ammonium hydroxide, organotin compounds such as dibutyltin dilaurate and di- or trialkyltin oxides, titanium complexes such as butyl titanate or triethanolamine titanate, ferric acetylacetonate, zinc acetate, lead octoate, and the like. Other catalysts include those that activate aminoplast-hydroxyl reactions such as sulfonic acids and phosphate esters including dodecylbenzene sulfonic acid, paratoluene sulfonic acid, and the like. The choice of specific catalysts depends on the fumctionality of the materials in the film-forming composition.

The catalyst is present in the film-forming composition at an amount of about 0.1 to about 5 percent, preferably about 1 to about 2 percent by weight, based on the total weight of resin solids in the film-forming composition.

Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to 40 percent by weight based on the total weight of resin solids.

In a separate embodiment of the invention, the amide, hydroxy amide, or hydroxy ester functional compound of the present invention may be used as an additive in a film-forming composition further comprising a resinous binder and a crosslinking agent. In this embodiment, the resinous binder is typically present in an amount of about 10 to about 89, preferably about 40 to about 80 percent by weight; the crosslinking agent is present in an amount of about 10 to about 80, preferably about 15 to about 58 percent by weight; and the amide, hydroxy amide, or hydroxy ester functional compound is used in an amount of about 1 to about 10, preferably about 2 to about 5 percent by weight, all based on the total weight of resin solids in the film-forming composition.

Examples of film-forming compositions in which the compound of the present invention may be used as an additive include acid-epoxy compositions such as those disclosed in U.S. Pat. No. 4,650,718. Other film-forming compositions may comprise polyol functional resinous binders cured with aminoplast and/or polyisocyanate crosslinking agents. Suitable polyol functional resinous binders include, for example, acrylic polyols, polyester polyols, polyether polyols, polyurethane polyols, and mixtures thereof. Suitable aminoplasts include those disclosed above. In a preferred embodiment, the film-forming composition is waterborne and comprises an acrylic polyol resinous binder, an aminoplast, and a hydroxy ester functional compound of the present invention which is a reaction product of a mixture of a biuret and isocyanurate of hexamethylene diisocyanate with ethyl lactate and N-aminopropyl-N,N-diethanolamine. Such a film-forming composition is particularly suitable for use as a container coating, such as for beverage cans, providing excellent hardness, chemical resistance anid flexibility.

The polyisocyanates which may be used as crosslinking agents may contain free or blocked isocyanate groups, and include those disclosed above. Suitable blocking agents include all those disclosed above. In a preferred embodiment, the film-forming composition is a two-package, solventborne composition and comprises an acrylic polyol resinous binder, a polyisocyanate, and a hydroxyl functional compound of the present invention which is a reaction product of isocyanurate of hexamethylene diisocyanate with ethyl lactate and aminopropyl triethoxysilane.

The film-forming compositions of the present invention may be solventborne or waterborne. Suitable solvent carriers include the various alcohols, esters, ethers, aromatic solvents, and other solvents, including mixtures thereof, that are known in the art of coating formulation. The film-forming compositions typically have a total solids content of about 40 to about 60 percent by weight.

The film-forming composition of the present invention is typically used as a clear coat applied alone to a substrate or on top of a colored base coat. Alternatively, the composition may contain color pigments conventionally used in surface coatings and may be used as a base coat or high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

When present, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

If desired, the film-forming composition may contain additional materials well known in the art of formulated surface coatings. These would include surfactants, flow control agents, thixotropic agents, fillers, anti-gassing agents, organic cosolvents, catalysts, and other customary auxiliaries. These materials can constitute up to about 40 percent of the total weight of the coating composition.

The film-forming compositions can be applied to various substrates to which they adhere including wood, metals, glass, and plastic. The compositions can be applied by conventional means including brushing, dipping, flow coating, spraying and the like, but they are most often applied by spraying. The usual spray techniques and equipment for air spraying and electrostatic spraying and either manual or automatic methods can be used.

During application of the film-forming composition to the substrate, a film is formed on the substrate. Typically, the coating thickness will be about 0.01 to about 5 mils (about 0.254 to about 127 microns), preferably about 0.1 to about 2 mils (about 2.54 to about 50.8 microns) in thickness.

After application of the composition to the substrate, a film is formed on the surface of the substrate by driving solvent, i. e., organic solvent and/or water, out of the film by heating or by an air drying period ("flashing"). More than one coating layer, including multiple top coats may be applied to develop the optimum appearance. Usually between coats, the previously applied coat is flashed at ambient conditions for about 1 to 20 minutes.

After application of the composition to the substrate, the coated substrate is heated to cure the coating layer(s). In the curing operation, solvents are driven off and the film-forming materials of the film-forming composition are crosslinked. The heating or curing operation is usually carried out at a temperature in the range of about 160–350° F. (71–177° C.) but if needed, lower or higher temperatures may be used as necessary to activate crosslinking mechanisms, depending on the functionality of the various components.

The invention will be further described by reference to the following examples. Unless otherwise indicated, all parts are by weight.

EXAMPLES

Example 1 illustrates the preparation of an active ester functional material of Structure (I), the reaction product of a polyisocyanate with an alpha-hydroxy functional ester. Examples 2–8 illustrate the preparation of hydroxy amide and hydroxy ester functional compounds of the present invention. Examples 9 to 11 illustrate the preparation of film-forming compositions according to the invention.

Example 1

Into a one-liter, 4-necked round bottom flask equipped with a stirrer, condenser, thermometer, heating mantle, dropping funnel and a nitrogen inlet, were charged 190 grams DESMODUR N 3400 (1 equivalent, a mixture of isocyanurate and biuret of hexane diisocyanate available from BAYER USA), 120 grams ethyl lactate (1.02 equivalents), and dibutyltindilaurate (DBTDL, 0.1%) and the mixture was slowly heated to 50° C. The reaction was allowed to exotherm, controlling the temperature below 80° C. using external cooling. When the exotherm was over the reaction mixture was held at 70° C. for 3–4 hours., at which point no residual isocyanate was detectable by infra red spectroscopy. The ethyl lactate-isocyanate adduct thus obtained was cooled and thinned to 70% with THF. Then 75 grams of ammonium hydroxide was added and the mixture held at room temperature for 8–12 hours. The solvents were removed by distillation and the residue was thinned to 70% with methyl isobutyl ketone (MIBK). C-13 and H-1 NMR data was consistent with the expected product, multifunctional urethane amide.

Example 2

An ethyl lactate-isocyanate adduct was prepared as in Example 1 and reacted with 62 grams monoethanolamine (1.02 equivalents) and the ethanol generated was removed (by azeotropic or vacuum distillation).

Example 3

To 310 grams ethyl lactate/isocyanate adduct (1 equivalents) prepared as in Example 1 was added 115 grams diethanolamine (1.1 equivalents). When the reaction exotherm subsided, the temperature was held at 85° C. and the progress of the reaction was followed by IR as well as monitoring the amine value by titration. The ethanol generated was removed by vacuum distillation. The C-13 and H-1 NMR data for the product was consistent with the expected urethane dialkanolamide structure.

Example 4

To 200 grams ethyl lactate/isocyanate adduct (0.65 equivalents) prepared as in Example 1 was slowly added 103 grams N-aminopropyl-N-diethanolamine (APDEA, 0.64 equivalents) at 25° C. The reaction exothermed to 68° C., and held at 70° C. till the amine value stalled (total milliequivalents amine=2.37; primary amine=0.122; secondary amine=0.209; tertiary amine=2.039). 125 grams of deionized water was added and the ethanol generated was removed by azeotropic distillation. When the head temperature was >99° C., the distillation was stopped and cooled to obtain, surprisingly, a clear solution of the product in water.

Example 5

Using the technique of Example 1, an ethyl lactate-isocyanate adduct was prepared using DESMODUR N 3300 (isocyanurate of hexamethylene diisocyanate, available from BAYER USA) in place of DESMODUR N 3400. When the resulting adduct was further reacted with APDEA, a completely water soluble product was obtained.

Example 6

To 297.92 grams ethyl lactate/TOLONATE HDT-LV (isocyanurate of HDI from Rhone Poulenc) adduct (0.97 equivalents) prepared as in Example was added 213 grams aminopropyl triethoxysilane (0.96 equivalents) at 23° C. After the initial exotherm, the reaction mixture was held at 90° C. till the amine value stalled. The ethanol generated in the reaction was not removed.

Example 7

To 620 grams ethyl lactate/DESMODUR N 3400 adduct (2.0 equivalents) prepared as in Example 1 was added 195 grams 2-methyl 1,3-propanediol (4.33 equivalents) at 50° C.

and heated slowly to 160° C., removing ethanol formed in the reaction. The residue was thinned with DOWANOL PM acetate to 72.86% solids. The resultant product had a Mn of 761, Mw of 968 and degree of dispersion of 1.27.

Example 8

To 462.5 grams ethyl lactate/ T1890 L (triisocyanurate of IPDI from Hüils) adduct (1 equivalents) prepared as in Example 1 was added 97.5 grams 1,2-butanediol (2.17 equivalents) and heated to 170° C., removing ethanol generated. The residue thinned to 85% solids with butyl acetate. The resultant product had an Mn of 1309, Mw of 1532 and degree of dispersion of 1.17.

Example 9 AND 10

Clear coatings were formulated from the reaction products of Examples 7 and 8 respectively by mixing the following components in accordance with normal paint formulation techniques:

70 parts by weight (based on solids) of the reaction product, 30 parts by weight of hexamethoxymethyl melamine (CYMEL 303 available from CYTEC Industries)

1–2% of para toluene sulfonic acid as catalyst.

The samples were reduced to about 60% solids by addition of PM acetate and then drawn down on steel panels. The coatings were baked for ten minutes at 180° C. and the extend of cure measured by MEK double rubs. The results are tabulated in Table 1.

TABLE 1

| Example | Polyol | MEK double rubs | Pencil Hardness |
| --- | --- | --- | --- |
| 9 | Example 7 | >100 | 2H |
| 10 | Example 8 | >100 | 4H |

The data in the Table indicate that film-forming compositions prepared in accordance with the present invention are curable at 180° C.

Example 11

Clear coatings were formulated from the reaction product of Example 5 by mixing it with BAYHYDUR XP-7063, a water reducible isocyanate crosslinking agent available from BAYER USA. The two components were mixed in equal parts (to obtain a ratio of NCO to OH of 1:1). The sample was reduced to about 60% solids by addition of water and then drawn down on steel panels. The coating was allowed to cure at room temperature. The film became tack free in 60 minutes. After 72 hours, the properties of the cured coating were evaluated and the results are shown in Table 2. The film-forming composition had a pot life of approximately three hours.

TABLE 2

| Example | Polyol | MEK double rubs | Pencil Hardness |
| --- | --- | --- | --- |
| 11 | Example 5 | >60 | 4B |

The data in Table 2 indicate that film-forming compositions prepared in accordance with the present invention are curable at room temperature.

We claim:

1. A hydroxy ester, hydroxy amide, or amide functional compound comprising the reaction product of:

(a) an active ester having the structure:

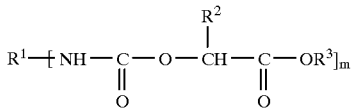

wherein:

$R^1$ is derived from a polyisocyanate $R^1(NCO)_m$ reacted with an active hydrogen-containing material to form the urethane group in the active ester;

m is at least 2;

$R^2$ is an alkyl or alkoxy group having from 1 to 4 carbon atoms; and $R^3$ is an alkyl group having from 1 to 4 carbon atoms; and (b) ammonia, a diol, or an amino functional material having the structure:

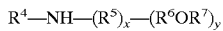

wherein $R^4$ is —H or alkanol;

$R^5$ is a polyvalent linking group comprising alkylene, alkylamino, urethane, or amido;

x is 0 or 1;

$R^6$ is a divalent linking group comprising alkylene, silane, or siloxane;

$R^7$ is —H or an alkyl group having from 1 to 4 carbon atoms; and y is 1 to 3.

2. The compound of claim 1 wherein $R^2$ is a methoxy group and $R^3$ is a methyl group.

3. The compound of claim 2 wherein the material of (a) is a reaction product of methyl hemiacetal of methyl glyoxylate and a polyisocyanate.

4. The compound of claim 3 wherein said polyisocyanate is selected from the group consisting of a reaction product of tetramethylxylene diisocyanate with trimethylolpropane, a reaction product of toluene diisocyanate with trimethylolpropane, a biuret of hexamethylene diisocyanate, an isocyanurate of hexamethylene diisocyanate, and mixtures thereof.

5. The compound of claim 1 wherein the active ester functional material of (a) is a reaction product of methyl or ethyl lactate and a polyisocyanate.

6. The compound of claim 5 wherein said polyisocyanate is selected from the group consisting of a reaction product of tetramethylxylene diisocyanate with trimethylolpropane, a reaction product of toluene diisocyanate with trimethylolpropane, a biuret of hexamethylene diisocyanate, an isocyanurate of hexamethylene diisocyanate, and mixtures thereof.

7. The compound of claim 1 wherein the material of (b) is a diol selected from 2-methyl-1,3-propanediol and 1,2-butanediol.

8. The compound of claim 1 wherein the material of (b) is diethanolamine.

9. The compound of claim 1 wherein the material of (b) is N-aminopropyl-N,N-diethanolamine.

10. The compound of claim 1 wherein the material of (b) is 2-amino-2-(hydroxymethyl)-1,3-propanediol.

11. The compound of claim 1 wherein the material of (b) is aminopropyl triethoxysilane.

12. The compound of claim 1 wherein the material of (b) is a reaction product of hydrazine and an alkylene carbonate or a lactone.

13. The compound of claim 12 wherein the material of (b) is a reaction product of hydrazine and ethylene carbonate.

14. A curable film-forming composition comprising
(a) a hydroxy ester, hydroxy amide, or amide functional compound comprising the reaction product of:
(i) an active ester functional material having the structure:

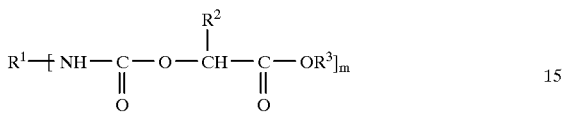

wherein:
$R^1$ is derived from a polyisocyanate $R^1(NCO)_m$ reacted with an active hydrogen-containing material to form the urethane group in the active ester;
m is at least 2;
$R^2$ is an alkyl or alkoxy group having from 1 to 4 carbon atoms; and
$R^3$ is an alkyl group having from 1 to 4 carbon atoms; and
(ii) ammonia, a diol, or an amino functional material having the structure:

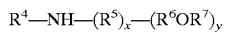

wherein:
$R^4$ is —H or alkanol;
$R^5$ is a polyvalent linking group comprising alkylene, alkylamino, urethane, or amido;
x is 0 or 1;
$R^6$ is a divalent linking group comprising alkylene, silane, or siloxane;
$R^7$ is —H or a lower alkyl group having from about 1 to about 4 carbon atoms; and
y is 1 to 3; and
(b) at least one material having functional groups that are reactive with polyols or amides.

15. The curable film-forming composition of claim 14, wherein component (b) is selected from the group consisting of polyacids, aminoplasts, phenol-formaldehyde condensates, polyisocyanates, and mixtures thereof.

16. The curable film-forming composition of claim 14, wherein said film-forming composition is waterborne.

17. The curable film-forming composition of claim 14, wherein component (a) is present in the curable film-forming composition in an amount of about 10 to about 80 percent by weight, based on the total weight of resin solids in the film-forming composition.

18. The curable film-forming composition of claim 14, wherein component (b) is present in the curable film-forming composition in an amount of about 20 to about 90 percent by weight, based on the total weight of resin solids in the film-forming composition.

19. A curable film-forming composition comprising
(a) a hydroxy ester, hydroxy amide, or amide functional compound comprising the reaction product of:
(i) an active ester functional material having the structure:

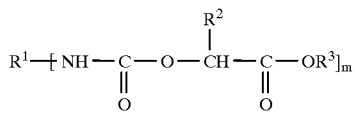

wherein:
$R^1$ is derived from a polyisocyanate $R^1(NCO)_m$ reacted with an active hydrogen-containing material to form the urethane group in the active ester;
m is at least 2;
$R^2$ is an alkyl or alkoxy group having from 1 to 4 carbon atoms; and
$R^3$ is an alkyl group having from 1 to 4 carbon atoms; and
(ii) ammonia, a diol, or an amino functional material having the structure:

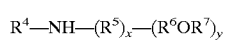

wherein:
$R^4$ is —H or alkanol;
$R^5$ is a polyvalent linking group comprising alkylene, alkylamino, urethane, or amido;
x is 0 or 1;
$R^6$ is a divalent linking group comprising alkylene, silane, or siloxane;
$R^7$ is —H or an alkyl group having from 1 to 4 carbon atoms; and
y is 1 to 3;
(b) a resinous binder; and
(c) a crosslinking agent; wherein component (a) is present in the curable film-forming composition in an amount of about 1 to about 10 percent by weight, component (b) is present in the curable film-forming composition in an amount of about 10 to about 89 percent by weight, and component (c) is present in the curable film-forming composition in an amount of about 10 to about 80 percent by weight, based on the total weight of resin solids in the curable film-forming composition.

20. The curable film-forming composition of claim 19, wherein the crosslinking agent is selected from aminoplasts, polyisocyanates, and mixtures thereof.

21. The curable film-forming composition of claim 20, wherein said film-forming composition is waterborne; component (a) comprises a reaction product of a mixture of a biuret and isocyanurate of hexamethylene diisocyanate with ethyl lactate and N-aminopropyl-N,N-diethanolamine; component (b) comprises an acrylic polyol; and component (c) comprises an aminoplast.

22. The curable film-forming composition of claim 20, wherein said film-forming composition is a two-package composition; component (a) comprises a reaction product of an isocyanurate of hexamethylene diisocyanate with ethyl lactate and aminopropyl triethoxysilane; component (b) comprises an acrylic polyol; and component (c) comprises a polyisocyanate.

23. A hydroxy amide functional compound comprising the reaction product of:
(a) an active ester having the structure:

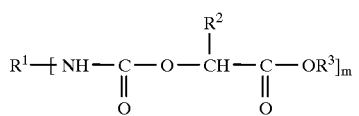
wherein:
R¹ is derived from a polyisocyanate $R^1(NCO)_m$ reacted with an active hydrogen-containing material to form the urethane group in the active ester;
m is at least 2;
R² is an alkyl or alkoxy group having from 1 to 4 carbon atoms; and
R³ is an alkyl group having from 1 to 4 carbon atoms; and
(b) N-aminoalkyl-N,N-dialkanolamine.
* * * * *